No. 635,323. Patented Oct. 24, 1899.
G. R. HOLLIS.
CORN PLANTER.
(Application filed Feb. 25, 1899.)
(No Model.)
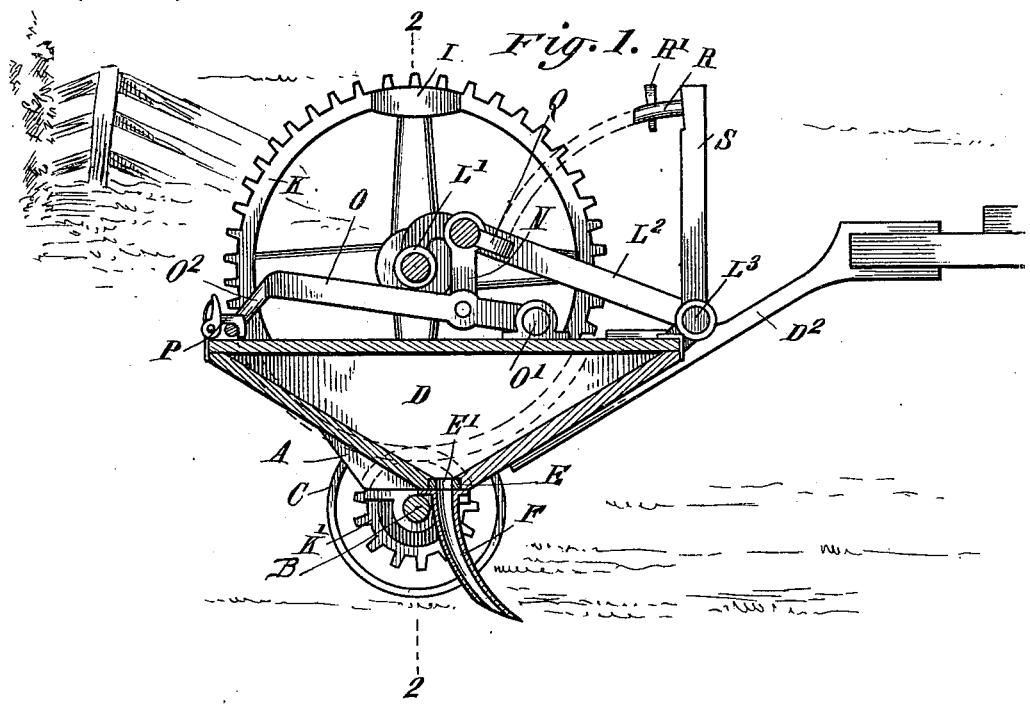
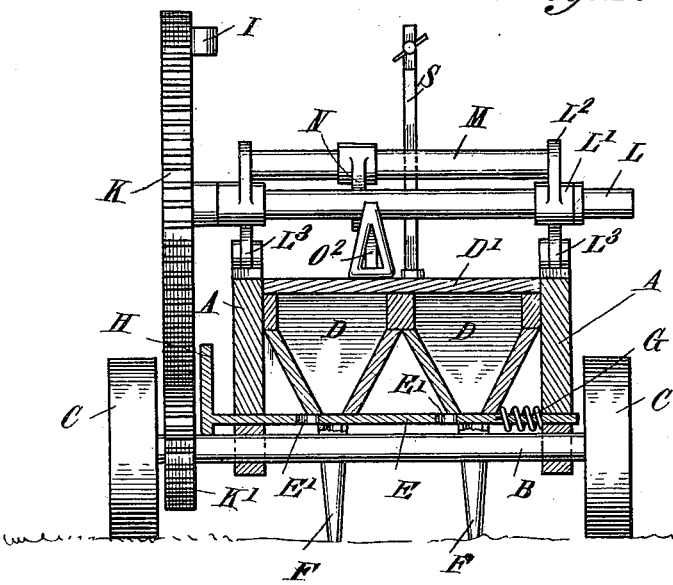
Witnesses
F. W. Riley
Chas. E. Brock
Inventor
George R. Hollis,
by Olmand & Co
Attorneys
THE NORRIS PETERS CO., PHOTO-LITHO., WASHINGTON, D. C.

UNITED STATES PATENT OFFICE.

GEORGE RICHARD HOLLIS, OF McDANIEL, MARYLAND.

CORN-PLANTER.

SPECIFICATION forming part of Letters Patent No. 635,323, dated October 24, 1899.

Application filed February 25, 1899. Serial No. 706,833. (No model.)

*To all whom it may concern:*

Be it known that I, GEORGE RICHARD HOLLIS, a citizen of the United States, residing at McDaniel, in the county of Talbot and State of Maryland, have invented a new and useful Improvement in Corn-Planters, of which the following is a specification.

This invention relates generally to corn-planters, and more particularly to one adapted to drop the corn at definite intervals through a drill-tube.

The invention while particularly adapted for corn can be used equally as well for any kind of grain, and while I have shown my invention as constructed for dropping two rows of corn at one time it can be constructed to drop only a single row.

One object of the invention is to provide a cheap and simple appliance which will drop the corn at regular intervals, and another object is to provide means capable of so operating which can be quickly and easily thrown out of operation whenever desired.

In the drawings forming part of this specification, Figure 1 is a vertical sectional view of a planter constructed in accordance with my invention. Fig. 2 is a section on the line 2 2 of Fig. 1.

In carrying out my invention I employ the side beams A, supported upon the axle B, mounted upon ground-wheels C. The double hopper D is arranged between the side beams A and is provided with the hinged cover D'. A suitable draft appliance $D^2$ is attached to the hopper and by means of which the planter can be drawn across the field. The cut-off slide E works through the bottom of the double hopper, said slide having openings E', which are adapted to register with the drill-tubes F, said tubes being arranged at the discharge end of the hopper, and whenever the cut-off slide is moved so as to bring the openings E' into register with the tubes F the grain will be dropped therethrough. The cut-off slide is normally held in such position, as shown in Fig. 2, to cut off the discharge of grain, and the spring G, surrounding the cut-off slide and bearing against one of the side members, will serve to hold the slide in this position.

For the purpose of forcing the slide inwardly to drop the grain I arrange an arm H upon the end of the cut-off slide, which arm is engaged by a wedge-shaped boss I, mounted upon the inner face of the gear-wheel K, which meshes with the pinion K', mounted upon the axle B. The gear K is mounted upon a shaft L, which is journaled in bearings L', mounted upon the ends of the arms $L^2$, which are pivoted at $L^3$ at the forward end of the hopper. The arms $L^2$ are connected by means of a cross-shaft M, from which hangs an arm N, which is pivotally connected to a lever O, pivoted to the top of the hopper at O' and having a loop $O^2$ at its rear end adapted to engage a spring-catch P, arranged upon the rear end of the hopper. The cross-shaft M also has an eye Q attached thereto, which eye is adapted to fit over a pin R, mounted at the end of the standard S, and passing through the pin R is a cross-pin R'.

When the planter is in use, the various parts are in the position shown in the drawings, the gear-wheel being held in mesh with the pinion by means of the lever O, thus securely fastened at its rear end. Whenever it is desired to move the planter from place to place and prevent the same from dropping grain, the gear-wheel K is lifted out of engagement with the pinion by releasing the lever O and lifting it so as to carry the eye Q over the pin R, and the cross-pin R' is then inserted, holding the arms $L^2$, lever O, and shaft L in an elevated position, consequently holding the gear-wheel out of engagement with the pinion.

It will thus be seen that I provide an exceedingly simple and efficient construction of corn-planter of the kind described.

Having thus fully described my invention, what I claim as new, and desire to secure by Letters Patent of the United States, is—

1. In a corn-planter, the combination with the hopper and delivery-tube, of the spring-actuated cut-off slide having an arm at one end, the axle and pinion mounted thereon, the gear having a wedge-shaped boss adapted to engage the arm on the cut-off slide, the shaft upon which said gear is mounted, the pivoted frame carrying said shaft, the lever for raising the said frame, a standard having a pin, an eye carried by the frame and adapted to pass over said pin, and a cross-pin for locking the frame in its raised position, substantially as shown and described.

2. In a corn-planter, the combination with the main frame and hopper, of the cut-off slide having an arm at one end, and a spring at the opposite end, the axle and pinion mounted thereon, the gear having a wedge-shaped boss adapted to engage the arm, the shaft upon which the gear is mounted, the pivoted arm carrying the said frame having an eye, the vertical standard, the pin carried by said standard adapted to engage the eye, and the cross-pin, the lever for raising the frame, said lever having a loop at its rear end, and a spring-actuated catch adapted to engage the loop at the end of the lever, substantially as and for the purpose described.

GEORGE RICHARD HOLLIS.

Witnesses:
 MALACHI RASIN,
 GEORGE C. RASIN.